(12) United States Patent
Nordman et al.

(10) Patent No.: US 11,154,855 B2
(45) Date of Patent: Oct. 26, 2021

(54) AUTOMATED LIQUID HANDLING AND TESTING SYSTEMS AND METHODS

(71) Applicant: CUSTOM SENSORS and TECHNOLOGY, Fenton, MO (US)

(72) Inventors: Richard Nordman, St. Charles, MO (US); Mike Ponstingl, Sunset Hills, MO (US)

(73) Assignee: CUSTOM SENSORS AND TECHNOLOGY, Fenton, MO (US)

(*) Notice: Subject to any disclaimer, the term of this patent is extended or adjusted under 35 U.S.C. 154(b) by 568 days.

(21) Appl. No.: 15/974,450

(22) Filed: May 8, 2018

(65) Prior Publication Data

US 2018/0318829 A1 Nov. 8, 2018

Related U.S. Application Data

(60) Provisional application No. 62/599,645, filed on Dec. 15, 2017, provisional application No. 62/511,694, (Continued)

(51) Int. Cl.
*B01L 3/00* (2006.01)
*G01N 21/17* (2006.01)
(Continued)

(52) U.S. Cl.
CPC ......... *B01L 3/502* (2013.01); *B01L 3/502738* (2013.01); *B01L 3/502769* (2013.01); *B01L 3/567* (2013.01); *G01N 21/17* (2013.01); *G01N 21/64* (2013.01); *B01L 2300/0867* (2013.01); *B01L 2400/0475* (2013.01); *B01L 2400/0487* (2013.01); *B01L 2400/06* (2013.01);
(Continued)

(58) Field of Classification Search
None
See application file for complete search history.

(56) References Cited

U.S. PATENT DOCUMENTS 7,101,515 B2 * 9/2006 Schwalbe ............ B01J 19/0033
422/130
8,817,241 B2 8/2014 LaFrancois et al.
(Continued)

FOREIGN PATENT DOCUMENTS

DE 10333384 B4 3/2008
EP 0259259 A2 3/1988

OTHER PUBLICATIONS

International Search Report, International Patent Application No. PCT/US2018/065787, dated Apr. 12, 2019 (2 pages).
(Continued)

*Primary Examiner* — Jill A Warden
*Assistant Examiner* — Brittany I Fisher
(74) *Attorney, Agent, or Firm* — Lewis Rice LLC

(57) ABSTRACT

A mixing system that employs a pump with a highly sensitive means of adding and controlling volumes of single or multiple reagents to a controllable volume of a sample, mixing said samples and reagents, providing the means of employing a specific measurement tool on some portion of the mixed sample, and finally reporting the results to a final control element automatically under industrial conditions and often essentially in situ to fluid flows such as fluid moving through a pipeline or industrial process.

20 Claims, 14 Drawing Sheets

Related U.S. Application Data filed on May 26, 2017, provisional application No. 62/503,144, filed on May 8, 2017.

(51) Int. Cl.
    *G01N 21/64*     (2006.01)
    *G01N 21/85*     (2006.01)
    *G01N 21/3577*     (2014.01)
    *G01N 21/77*     (2006.01)
    *G01N 21/84*     (2006.01)

(52) U.S. Cl.
    CPC ......... *G01N 21/3577* (2013.01); *G01N 21/85* (2013.01); *G01N 2021/7786* (2013.01); *G01N 2021/8411* (2013.01)

(56) References Cited

U.S. PATENT DOCUMENTS

| | | | |
|---|---|---|---|
| 2002/0045265 A1 | 4/2002 | Bergh et al. | |
| 2009/0142845 A1* | 6/2009 | Benali | B01J 19/0093 |
| | | | 436/8 |
| 2011/0083842 A1 | 4/2011 | Indo et al. | |
| 2013/0224075 A1* | 8/2013 | Linder | G01N 21/05 |
| | | | 422/82.09 |
| 2014/0369889 A1* | 12/2014 | Mostowfi | G01N 21/05 |
| | | | 422/82.09 |
| 2015/0093833 A1* | 4/2015 | Fougere | C10L 1/003 |
| | | | 436/40 |
| 2017/0106134 A1* | 4/2017 | Dreschel | B01L 3/502761 |
| 2017/0234842 A1 | 8/2017 | Reed | |

OTHER PUBLICATIONS

HACH Company Manual, Series 5000, Silica Analyzer, Model 60000 (126 pages).

ABB Measurement & Analytics, Operating Instruction Manual, Aztec 600 aluminium, ammonia, color, iron, manganese phosphate / Single- and multi-stream colorimetric analyzers, IM/AZT6CR-EN Rev. O; www.abb.com/measurement, dated Nov. 2018 (108 pages).

ABB Measurement & Analytics / Data Sheet, Aztec 600 Ammonia, Ammonia analyzer, DS/AZT6AM-EN Rev. D (16 pages).

ABB Measurement & Analytics / White Paper, ABB Aztec 600 Colorimetric Analyzer, Pure Continuity, Clear Compliance, Safeguarding against the issues of appearance, odour and taste of potable water, WP/ANAINST/003-EN Rev. A (12 pages).

Waltron Group Brochure, 3041 Silica Analyzer, General Specifications, www.waltron.net (2 pages).

European Search Report for Application No. EP 18 88 8893, dated Jul. 26, 2021, 9 pages.

\* cited by examiner

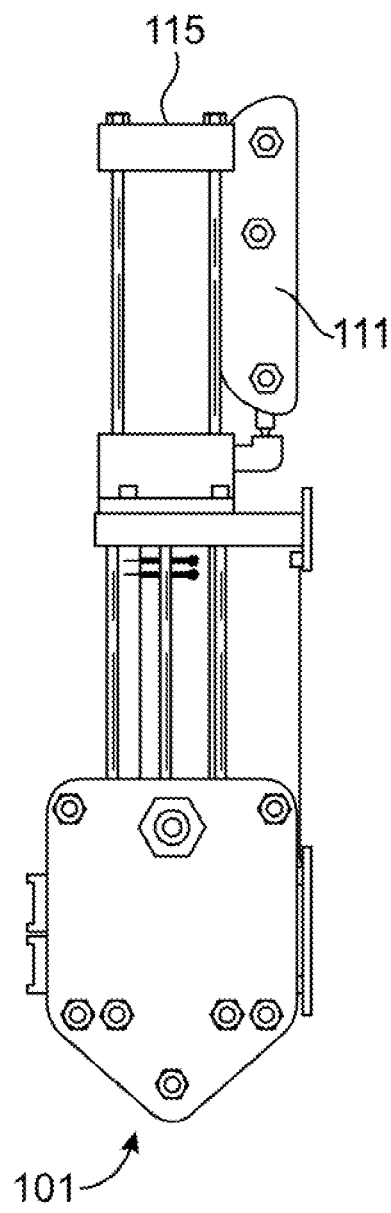
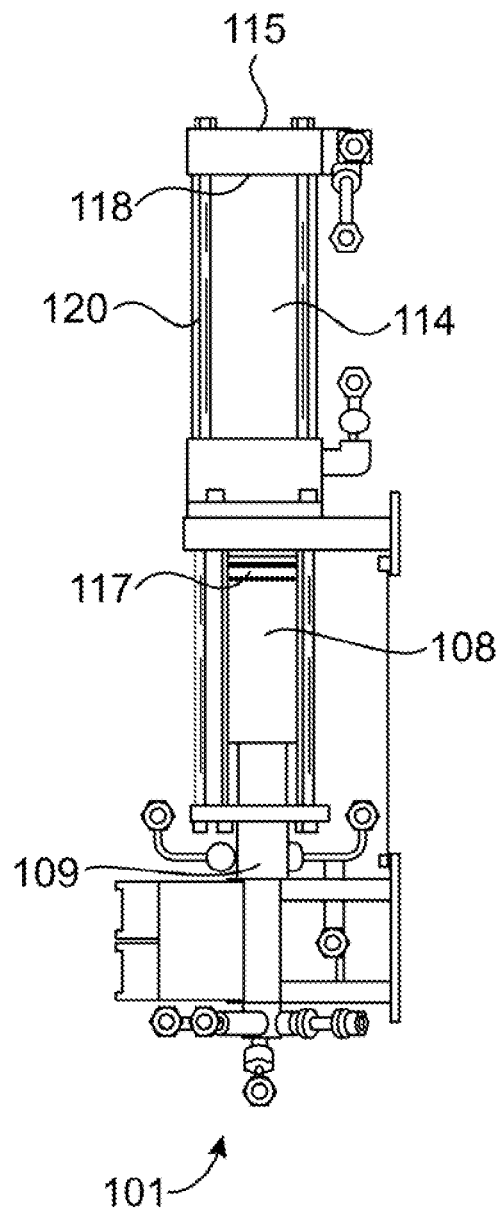
FIG. 4A
FIG. 4B

AUTOMATED LIQUID HANDLING AND TESTING SYSTEMS AND METHODS

CROSS REFERENCE TO RELATED APPLICATION(S)

This application claims the benefit of U.S. Provisional Application Ser. Nos. 62/599,645, filed Dec. 15, 2017; 62/511,694, filed May 26, 2017; and 62/503,144, filed May 8, 2017. The entire disclosure of all the above references is herein incorporated by reference.

BACKGROUND OF THE INVENTION

1. Field of the Invention

This disclosure is related to the field of liquid extraction systems. More particularly to systems, methods, and apparatus for performing liquid extraction and manipulation of a sample for testing and measurement.

2. Description of the Related Art

Anybody who has owned a bottle of salad dressing has likely made a casual chemical observation: oil and water do not mix or at least separate over time. The causes of this axiomatic chemical phenomenon have actually been subject to some debate, with various explanations offered including electrical charge, density differential, that molecular water bonds are too strong to be broken by solvent-solute forces, and solvation entropy.

Regardless of the causes, the fact remains that oil and water are immiscible, meaning they do not ordinary blend or mix with each other. However, as with salad dressing, it is possible to form an at least temporarily stable mixture of oil and water through the use of a third party chemical, which acts as a mediator between the immiscibles. This mediating chemical is known as an emulsifier, and the resulting mixture is known as an emulsion. Emulsions can also be formed, at least temporarily, through the mixing (mechanical agitation) of the otherwise immiscible components. Such mixing is generally best when it is involves the inclusion of high shear and substantial speed as is the case when the bottle is shaken.

While emulsions are perhaps most familiar in the culinary arts, they are not limited to culinary applications. Chemically, an emulsion is a specific type of colloid, a multi-phase system of matter when two usually immiscible substances form a mixture. Unlike a solution, whose solute and solvent constitute a single phase, a colloid has a dispersed phase comprising suspended particles, and a continuous phase, comprising the medium of suspension. An emulsion is a specific type of colloid in which both substances are liquids, also known as a liquid-liquid mixture; that is, both the dispersed substance and the medium of dispersion are liquids. One or both of the liquids may itself be a solution. For example, in salad dressing, the oils (a liquid) are typically dispersed as small droplets throughout a water solution, such as water and acetic acid (also a liquid), which is the dispersion medium.

The dispersed substance is typically formed into small particles, which are distributed throughout the medium of dispersion, often with the aid of an emulsifier, which acts as a chemical mediator between the two immiscible substances, or through the application of force which breaks the dispersed substance into smaller "particles" and distributes them throughout the medium of dispersion. There are a number of different mechanisms of emulsifications, and not all emulsifications are equally stable. While many emulsifications have a stability measured in minutes up until days or weeks, emulsions in other chemical applications may have very little, or effectively no, stability, and require constant or near-constant mixing to maintain the emulsion or may require a relatively long time, such as 15 minutes or more, to readily separate. Further, even after separation, the separation may be incomplete as the dispersed substance may stick to the wall of the separation vessel or otherwise interact with the environment as part of the separation step.

Mixing (or remixing) of the dispersant into the medium may be performed through the application of an external force, such as mechanical agitation. Once this force is removed, however, the dispersed substance begins to separate from the medium of dispersion. This also can be seen with ordinary salad dressing, in which the oils will separate from the water over time, but are easily remixed via manual agitation by shaking the bottle.

Colloids and emulsions can present unique problems when present in chemical processes. Specifically, it is often desirable in the chemical and industrial arts to measure the respective dispersant to medium content, or other chemical property, of the emulsion or a portion of the emulsion. It can be particularly valuable to do so in situ or near in situ and to do so with a sample from a moving environment such as fluid flowing through a pipeline or an industrial process. As a simple example, crude oil and other materials present in an oil refinery or other processing facility for oils often comprise emulsifications of oil and water. As it is generally desired that the emulsifications be separated as part of the processing (or as part of waste disposal) it can be valuable to determine the amount of water present in the emulsification to make sure this process is performed effectively and economically.

Further, crude oil is notoriously sticky, even in emulsification and particularly when separated from water by allowing the emulsification to settle. This means that process machinery that handles crude oil emulsifications can slowly become degraded through crude oil settling on surfaces. To control this, chemicals are often added to the emulsification to keep the crude oil from settling. However, as these chemicals are expensive and the amount needed is dependent on the amount of oil in the emulsification, it can be highly desirable to both evaluate the amount of oil present, and the amount of such chemicals currently present in the process flow at any time.

These types of measurements and calculations are typically performed on a sample of the emulsification in question through any number of means known in the art, ranging from optical spectrometry, conductivity, extraction, reaction, and/or temperature measurements. However, most measuring systems require the measured substance to be placed into a specific receptacle for measuring, and require the sample to be in a specific form. For an emulsion, removing the substance from its initial environment (such as within product moving through a pipeline) and placing a sample in the measuring instrument can result in sufficient separation after a certain amount of time to allow accurate readings of various components of the emulsion, or to make such readings inaccurate depending on if the separation or emulsion is needed for, or hinders, the measurement.

Further, the process of separation can take time and for products such as crude oil the separation can result in residues being left in the measuring device or otherwise presenting a situation where the measuring instrument requires substantial cleaning between tests to avoid inaccurate calculations. This means that performing in situ measurements, or even measurements where a removed sample is from a relatively close period to the product currently in a moving stream, can be very difficult. It has also meant that automated measurement machines are often not used and tests are performed by lab technicians. The problem is compounded if multiple different tests need to be performed on the sample where certain tests may require separation, some may require specific additives and some may not, or some need to be performed on a portion of the sample only. What is needed is a flexible system and method for providing measurements of the components of an emulsion where the emulsion can be separated, mixed (both with itself and with additives), analyzed, and disposed of or returned to a process stream very quickly, and the instrument can also be quickly returned to a state where a second analysis can occur quickly so that it can operate on moving process flow to provide periodic measurements. Finally, it is desirable for such a system to perform all such steps without human intervention, at least after an initial setup, and to be able to potentially detect a problem such as getting a known to be inaccurate sample (e.g. because the emulsion input included a large "particle" or dispersant not correctly dispersed), correct from that situation, and obtain a new sample.

SUMMARY OF THE INVENTION

The following is a summary of the invention, which should provide to the reader a basic understanding of some aspects of the invention. This summary is not intended to identify critical elements of the invention or in any way to delineate the scope of the invention. The sole purpose of this summary is to present in simplified text some aspects of the invention as a prelude to the more detailed description presented below.

Because of these and other problems in the art, described herein, among other things, is a mixing system that employs a single or double piston pump with a highly sensitive means of adding and controlling volumes of single or multiple reagents to a controllable volume of a sample, mixing the samples and reagents, providing the means of employing a specific measurement tool on some portion of the mixed sample, and finally reporting the results to a final control element automatically under industrial conditions and often essentially in situ to fluid flows such as fluid moving through a pipeline or industrial process.

In an embodiment, there is described a device for handling a sample comprising: a pump; a pump chamber; and a valve arrangement; wherein, the pump will provide a liquid sample from a sample source to the pump chamber, the liquid sample passing through the valve arrangement; wherein, while same sample is moving through the valve arrangement, a liquid additive is simultaneously pulled from an additive source through the valve arrangement and the liquid sample and the liquid additive are mixed in the pump chamber by the action of the pump; and wherein a measurement can be taken of the liquid sample and liquid additive mixture in the pump chamber.

In an embodiment, the device further comprises a mixing chamber, wherein the 1 mixture can be moved from the pump chamber to the mixing chamber through the valve arrangement by the pump, the mixture being agitated by the movement.

In an embodiment of the device, an additional liquid additive is mixed into the mixture as it passes through the valve arrangement.

In an embodiment of the device, the mixture can be returned to the pump chamber from the mixing chamber through the valve arrangement by the pump, the mixture being agitated by the movement.

In an embodiment of the device, a further additional liquid additive is mixed into the mixture as it passes through the valve arrangement from the mixing chamber to the pump chamber.

In an embodiment of the device, the liquid sample is an emulsion.

In an embodiment of the device, the measurement is performed on the liquid sample while the sample is an emulsion.

In an embodiment of the device, the liquid additive is a solvent separating a first immiscible from the emulsion.

In an embodiment of the device, the measurement is performed on the first immiscible.

In an embodiment of the device, the measurement is performed on what remains of the emulsion after the first immiscible has been separated.

In an embodiment the device further comprises: a mixing chamber, wherein first immiscible is moved from the sample chamber to the mixing chamber through the valve arrangement by the pump and what remains of the emulsion after the first immiscible is left in the pump chamber.

In an embodiment of the device, the first immiscible is then exhausted from the system and the remains of the emulsion after the first immiscible is separated is moved to the mixing chamber by the pump.

In an embodiment of the device, the remains of the emulsion after the first immiscible is separated is mixed with an additional additive from the valve arrangement as it is moved to the mixing chamber by the pump.

In an embodiment of the device, the remains of the emulsion after the first immiscible is separated is then exhausted from the system and the first immiscible is moved to the pump chamber by the pump.

In an embodiment of the device, the first immiscible is mixed with an additional additive from the valve arrangement as it is moved to the pump chamber by the pump.

In an embodiment of the device, the emulsion is an oil and water emulsion.

In an embodiment of the device, the additive is toluene.

In an embodiment of the device, the measurement is a fluorescence measurement.

In an embodiment of the device, the measurement is a light absorption measurement

BRIEF DESCRIPTION OF THE DRAWINGS

FIGS. 4A and 4B depict side elevation views of the embodiment of FIG. 1. FIG. 4A shows connection panels in place while FIG. 4B has them removed.

DETAILED DESCRIPTION OF THE PREFERRED EMBODIMENT(S)

Figure 1:
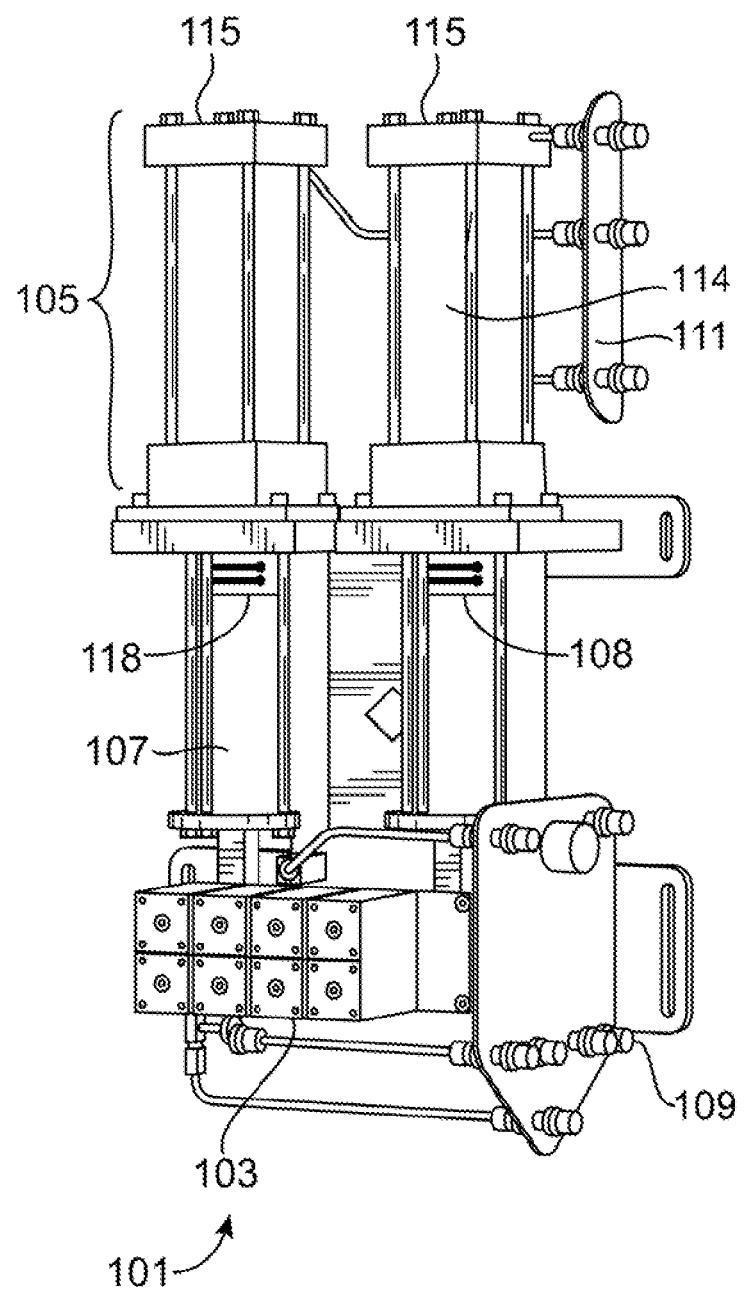
FIG. 1 depicts a front perspective view of a first embodiment of a liquid handling system.
Figure 2:
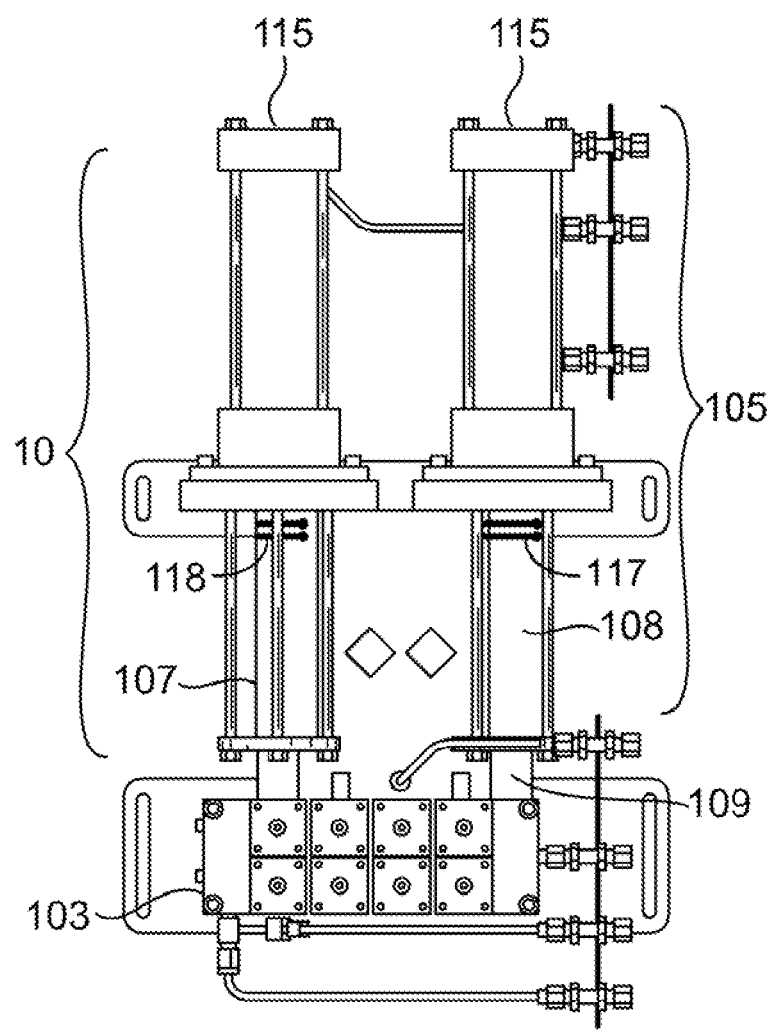
FIG. 2 depicts a front plan view of the embodiment of FIG. 1.

Described herein are a variety of automated systems for liquid handling and testing which are commonly referred to as "automated extraction systems" or simply AES. AES are generally configured to perform a fully automated liquid-liquid extraction, and to deliver the extract to an analysis cell either in an original mixed form, or a separated form, generally having been mixed with an additive to assist in the analysis, although that is not required. The AES will then also include traditional measurement or analysis tools attached thereto to perform an analysis on the extract such as, but not limited to, measuring the amount of a dispersant or other material in the mixture. Finally, an AES will generally be able to return the tested sample to the process stream, or dispose of it, and provide the results of the measurements performed to a computer or human for analysis.

Measurement on the extracted sample may be performed by, among other things, using an absorbance or fluorescence measurement to determine the concentration of the extracted solute within the sample. These types of measurements may be performed by any type of testing or measurement instrument known now or later discovered and these instruments will generally be mounted to the AES at fixed points as contemplated later in this discussion. The AES may be used to allow the analysis on the extracted sample to occur prior to separation of components of an emulsion or similar composition, on an emulsion which has been allowed to separate naturally, or on an emulsion to which specific solvents or other additives have been added to induce stronger or faster separation. The latter will generally be the preferred method of operation, however, the AES described herein allow for any and all of such actions to be performed on any sample and can be operated to provide different measurements on a sample in multiple different states based on the test to be performed.

Embodiments of AES described herein will generally perform the mechanical functions of extracting a sample from a process environment and then manipulating that sample for testing. Often the sample will be withdrawn from a continuous flow (such as through a pipeline) but that is not required and in alternative embodiments sample can be taken from more static sources (such as, for example, settling tanks). As such, the AES will generally be mounted near a process line at which measurement will be performed.

The AES generally contains components required to operate the handling system and manipulate the sample and will commonly have mounted thereto a selection of apparatus to perform any absorbance, fluorescence, or other measurement on the sample. The system is designed to be mounted remotely in a non-hazardous location, or to be contained within a purged enclosure or other clean room suitable for the particular installation area.

The automatic extraction systems and methods described herein may be used to extract one or more variable volume(s) of liquid samples from a process stream which will generally have within it an emulsion, often of a petroleum or other oil and water such as can be the case with crude oil or similar materials. The systems and methods may also be used to add to this mixture one or more reagents or indicators. These may be added both as the sample is withdrawn and later as the sample is manipulated depending on embodiment and the testing to be performed. These reagents or indicators may provide a measurable reading of the component(s) of the process stream and/or to help separate or identify the components of the process stream. For example, toluene may be added to an oil and water mixture to help the oil and water separate quickly and cleanly. Additionally, the systems and methods may also be used to dynamically dilute one or more samples with a solvent, extract one or more components from a liquid sample, maintain or recreate a colloidal mixture, react one or more reagents with a sample (such as to form a color or a fluorescing tagged molecule), acid/base titration, filter solids from a liquid sample, and other functions each with the ability to control various parameters in the process. The systems and methods may be used with a fluorescence, reflectance, or absorbance-based photometer, but, in an embodiment, any number of other measuring devices or methods known in the art, may be used. These devices may include, without limitation, an ultraviolet-visible spectroscopy or spectrophotometry (UV-VIS), near-infrared (NIR) optical spectrometer, pH electrode, oxidation/reduction potential electrode, conductivity electrode, or temperature measuring device.

Figure 3:
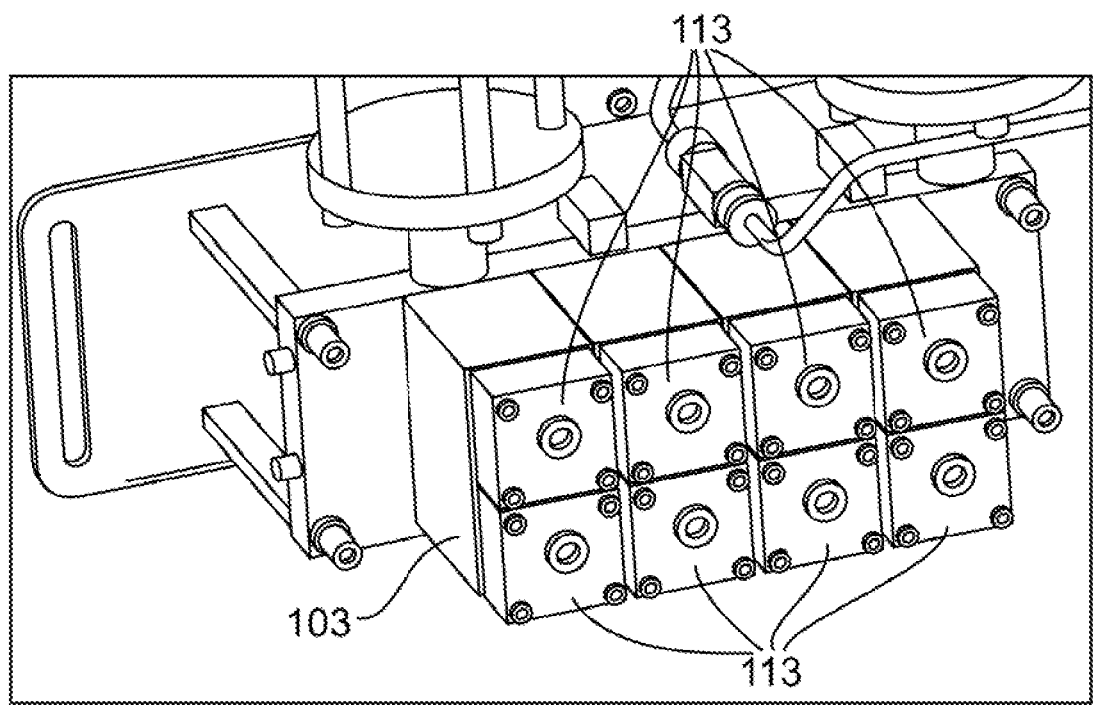
FIG. 3 depicts a detail view of the stream switching valve system of the embodiment of FIG. 1.

FIGS. 1 through 4B depict a first embodiment of an AES 101 in accordance with the present disclosure. The depicted system 101 of FIGS. 1 through 4B utilizes two pumps and two sample chambers and is shown from a front perspective view in FIG. 1, a front perspective view in FIG. 2, and in two different side views in FIGS. 4A and 4B. FIG. 3 provides a detail view of the stream switching valve system. The depicted handling system 101 of FIGS. 1 through 4B comprises four major component systems. First, the depicted handling system 101 comprises a stream switching valve system 103, which is configured to direct and control fluid movement through various configurable fluid paths through the system 101. Second, the depicted system 101 comprises a variable displacement syringe pump system 105 configured to meter fluid volumes and provide fluid propulsion within the system 101. Third, the depicted system 101 comprises two different sample chambers which are referred to as mixing chamber 107 and syringe pump chamber 108 which are used to perform liquid-liquid extraction (or emulsification) as well as mixing of the sample with various other chemicals. Finally, the depicted system 101 comprises an analysis system 109 configured to perform measurement, such as using absorbance or fluorescence. Also shown in FIGS. 1 through 4B are connections for parts 111 for external instrumentation or other connections.

In the depicted embodiments of FIGS. 1 through 4B, the stream switching valve system 103, as best shown in FIG. 3, comprises a modular component system 103 having one or more stream-select modules 113. One or more of these stream-select modules 113 may comprise built-in pneumatic actuator(s) configured to introduce any one of a plurality of different fluids to the syringe pump system 105. As can be seen in FIG. 3, the stream switching valve system 103 comprises a compact assembly of one or more stream-select modules 113. In an embodiment, the number of stream-select modules 113 is determined or selected based on the number of incoming fluid streams.

Each of the stream-select modules 113 will generally be connected to a source of liquid and/or to an exhaust port. At least one of the stream-select modules 113 will be connected to the process stream or other source from which the sample is to be drawn. Other stream-select modules 113 will be connected to sources of solvents, reactants, markers, or other materials which are to be mixed with the sample or a portion of the sample. As would be readily understood by one of ordinary skill in the art, the system 101 can be modified to accept any number of solvents, samples, or other materials simply by including additional stream-select modules 113 to the stream switching valve system 103 and introducing additional fluid inlet and/or outlet paths. In the depicted embodiment, the stream switching valve system 103 is constructed of stainless steel and may include Kalrez seals. The method and manner of producing such an assembly is well within the knowledge of one of ordinary skill in the art.

The depicted variable displacement syringe pump system 105 is configured to meter both solvent and sample volumes, and to propel fluids throughout the system 101. In an embodiment, solvent and sample ratios may be dynamically calibrated to suit the needs of each particular installation. A more detailed view of an embodiment of a variable displacement syringe pump system 105 according to the present disclosure is depicted in FIG. 4B. In the depicted embodiment of FIG. 4B, the pump system 105 comprises a pneumatic cylinder 114 sealedly connected to a syringe pump chamber 108, which is a borosilicate glass tube in the depicted embodiment but that is by no means required and the pump chamber 108 may be constructed of stainless steel or other materials depending on the needs of the particular material to be handled and the tests to be performed. Steel tubes will often be preferred for while they provide for less ability to perform direct optical measurements without inclusion of an inserted probe, a steel chamber 108 can often be more readily connected to other components without risk of leakage through the use of conventional sealing mechanisms such as O-rings.

An internal syringe piston 115 in the pump chamber 108 comprises a piston head 117 sealedly disposed in the syringe pump chamber 108. The syringe piston head 117 is connected to an opposing cap end 118 in the pneumatic cylinder 114 by a rod 120 extending therebetween. In the depicted embodiment, the pump system 105 volume is approximately one hundred fifty milliliters (150 mL), but the volume in any particular embodiment may vary according to the needs of the installation. A second syringe piston 115 will generally be similarly positioned in the mixing chamber 107 with the second syringe piston 115 operating in tandem with the first 115.

Any number of control systems or means may be used to activate and control the syringe pistons 115. In the depicted embodiment, positional control of the syringe piston 115 is achieved by the use of one or more proportional pressure regulators 119 which are, in turn, controlled by a computer running appropriate software or a hardware control system in the form of wired electronics. The proportional pressure regulator(s) 119 are configured to control the position of the syringe piston head 117 in the syringe pump chamber 108. In an embodiment, such regulators 119 facilitate variable displacement of fluids within the system 101 by moving the syringe piston 115 to push fluid out of the chamber 108 or 107 or create a vacuum to draw fluid into the chamber 108 or 107. Generally, which of these is to be performed will depend on the current location of the sample and the preferred operation of the system 101.

Figure 6:
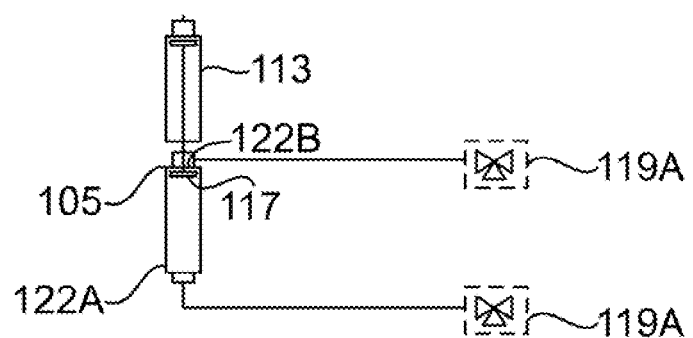
FIG. 6 depicts a schematic diagram of an embodiment of a regulator and syringe pump system.

As shown in FIG. 6, generally, a first regulator 119A maintains a constant pressure on the rod side 122A of the pneumatic cylinder 114, and a second regulator 119B controls pressure on the cap side 122B. By way of example and not limitation, one or more of the proportional pressure regulators 119A and 119B may be of the type manufactured by Aventics, part number ED02. The regulators 119A and 119B are generally controlled by a controller 121, which is configured to send pressure command signals to the proportional pressure regulators 119A and 119B. The controller 121 may be an analog device, digital device, or an external computer system running appropriate software. In the depicted embodiment, the controller 121 is an electro-pneumatic positioning controller 121.

The controller 121 may be configured to compare the pressure ratio of one side 122A of the pneumatic cylinder 114 to the other 122B. In the depicted embodiment, the controller 121 is a proportional-integral-derivative (PID) loop controller 121 configured to deliver an analog output to one or both of the proportional pressure regulators 119A and 119B to adjust pressure as needed to move and place the piston 115. Pressure differentials on either side of the piston cap 118 cause or facilitate movement of the syringe piston 115. The regulators 119A and 119B may continually operate to control the pressure within the pneumatic cylinder 114. In an embodiment, the regulators 119A and 119B control pressure to within 0.10 pounds per square inch (psi), with the positioning accuracy of the piston 115 of approximately plus or minus one millimeter.

While the embodiment of FIG. 1 provides for two sample chambers 107 and 108 each of which includes a piston pump 115, one of ordinary skill in the art will understand that if the chambers 107 and 108 are sealed, the movement between them may be accomplished by a single pump 115 in a single of the chambers 107 or 108. Specifically, the single pump 115 may utilize a push to move fluid from the chamber 107 or 108 in which it is mounted into the other chamber 107 or 108, or a pull (to create a vacuum) to move fluid not in the chamber into it.

In the depicted embodiment, the mixing chamber 107 is a clear tube generally located in a position parallel to the syringe pump system 105. However, as is the case with chamber 108 a steel or similar material chamber may be preferred for sealing reasons. When in use, fluids will commonly alternate between the mixing chamber 108 and syringe pump chamber 108 to provide mixing or extraction action as appropriate. During this process, the fluids exchanged between the syringe pump chamber 108 and the mixing chamber 107 pass through the stream switching valve arrangement 103. This facilitates that fluids within the system 101 being incorporated during an extraction or mixing process and accurate dispersion of solvents, additives, indicators, or other materials to be added to the emulsion provided.

As described elsewhere herein, movement of the syringe piston 115 causes fluid flow through the system 101. The pressure of fluid being added to or removed from the mixing chamber 107 may also result in movement of the mixing chamber piston 115 (if present). The mixing chamber 107 is thus in fluid communication with the syringe pump chamber 108. It is preferable that the mixing chamber 107 be disposed in a vertical alignment with respect to gravity such that the point of egress from the mixing chamber 107 is located at the bottom of the mixing chamber 107 with respect to gravity. Thus, when the piston 115 moves and creates a vacuum in the fluid path of the system 101, fluid in the mixing chamber 107 will more easily egress from the mixing chamber 107 at the bottom, aided by gravity. Further, with the mixing chamber 107 and pump chamber 108 are preferably elongated in a vertical dimension. In this arrangement, gravity can also be used to more clearly and understandably segregate non-mixing materials into layers. For example, it is well understood that if an oil and water emulsion is separated, the oil will be vertically (with respect to gravity) on top of the water. Thus, with vertical elongation of the chambers 107 and 108 tests performed from the top or bottom of the chamber will be clearly directed into a specific material first.

In an embodiment, fluid is exchanged between the mixing chamber 107 and the syringe pump chamber 108 until the extraction process and all measurements are complete. Operation, of the system 101 will generally operate loosely as follows, but various specific operations are discussed in conjunction with FIG. 8-10. When a sample is to be withdrawn from the process flow, the valve arrangement 103 is set so that a withdrawal action of one of the pistons 115 will serve to pull fluid through the valve arrangement 103 from the sample source. To put this simply, the valve 113 connected to the sample source is opened and piston 115 is moved to pull the sample in.

The sample will generally, however, not be pulled in alone. Specifically, any number of additional valves 113 may be opened simultaneously so that the action of the piston 115 will actually pull fluid from multiple sources at the same time. As should be apparent, how open each valve 113 is (as well as its size and configuration) relative to all the other valves 113 will determine a specific ratio of all the fluid to be pulled in with the single pump stroke.

It should also be apparent that the action of pulling the fluids from multiple sources will generally result in a strong mechanical agitation (mixing) of the liquids and, thus, the added chemicals will generally be strongly mechanically agitated with the sample as they are withdrawn. This can provide for mixing of a solvent or other additive to the sample as the sample is withdrawn into the system 101. In a preferred embodiment, the sample will comprise a emulsion and at least one of the added liquids will comprise some form of emulsifier or solvent depending on if measurements are to be taken on the emulsion or on its separated components. For purposes of this discussion, we will presume a solvent to separate the emulsion is added for ease of discussion.

By adding such a chemical to the emulsion, the emulsion will generally enter a first sample chamber (we are going to utilize pump chamber 108 as this initial chamber simply for ease of discussion but either chamber 107 or 108 can be initially used) already combined with a solvent. Once the sample and solvent combination is in the chamber 108, the sample will be allowed to settle and the emulsion will generally separate into its components. At this time, measurements may be performed on either or both of the separated components and what measurement is performed on what will generally be determined by the position of the various measuring instruments with regards to chamber 108.

It should be recognized that additional measurements may be required and instruments for those are not present on the chamber 108. Alternatively, another chemical may need to be added to one or both of the constituents (immiscibles) of the emulsion to perform another measurement. In either case, the pumps 115 will serve to move the liquid from chamber 108 to chamber 107. As should be apparent, this will be performed by activating the pumps 115 and the liquid flowing through the valves 103. It should also be apparent that as the liquid goes through the valves 103 additional valves 113 may be opened simultaneously or sequentially to mix additional chemicals with the liquids as they transfer between the two chambers. Further, the emulsion will also generally be reformed from the separated state due to the shear imparted on the liquid by passing through the valves 103.

Once in the other chamber 107, the emulsion may again be allowed to separate and now measurements based on the instruments located in chamber 107 (as opposed to those in chamber 108) may be performed). Alternatively or additionally, the liquid may be sent back through the valve assembly 103 to chamber 108 to perform additional measurements there if the addition of another chemical allows for a different measurement to be performed. Once all tests are completed, the valve arrangement 103 may be positioned to an exhaust position where the sample is disposed of or returned to the process stream as desired.

As should be apparent from the above, the system 101 provides for a large amount of different tests to be performed on the sample and allows for a near limitless number of additional chemicals to be added to the sample in the performance of those tests. Further, due to the separation of the sample and the positioning of the analysis instruments (as discussed in more detail below), any test may be performed on the same sample in the emulsion state, in a separated state, and on each of the constituents of the separated state individually simply by how the sample is positioned within the system 101.

In the depicted embodiment, the analysis system 109 is positioned in the fluid flow path and comprises the interface for the concentration measurement. The interface may be secured to the chamber with high-performance liquid chromatography (HPLC) fittings. Such fittings may provide a high-pressure seal, with low dead volume within the chamber. The depicted analysis system 109 comprises an analysis chamber and/or cell and/or may be configured for a fluorescence measurement interface, and/or one or more absorbance interfaces. Additionally, the optical path length is adjustable in absorbance applications. This may be done, for example, by fastening the optical interface couplers in the proper position with the HPLC fittings.

The depicted system 101 is configured for use with a number of optional accessories. For example, the system may comprise additional ports for calibration, samples, or solvents. These may be added for example, by incorporating additional stream select modules 113 to the stream switching valve system 103. Additionally, if waste is to be expelled to the sample stream, the waste port may be removed. The system 101 may also be configured for one or more different measurement methods, and is configurable to perform automatic self-cleaning and instrument zero cycles, as described elsewhere herein.

Similarly, different measurement instruments may be positioned at different locations in the various chambers. For example, a fluorescence instrument may be positioned to measure downward into chamber 108 (measure the "top" component of a separated emulsion) while an absorbance instrument may be positioned to measure upward into the same chamber 108 (measure the "bottom" components of a separated emulsion). Chamber 107 may also have multiple instruments. It should be noted that instruments herein are generally mounted to measure the "bottom" of the liquid or the "top" of the liquid. While positioning the measurement instrument above or below the sample chamber 107 or 108 provides an easy method to determine which portion of the separated emulsion is being measured, it is not required, and an instrument may be presented at the side of the chamber, at any height, to provide for additional measurement options. The only key is that the portion of the sample of interest be able to reach the height of the instrument to allow the measurement to be performed on that portion.

The key to instrumentation is that the location of the instrument will allow it to act on either the emulsion state of the liquid, or on any of its constituents. Further, movement of the sample between the two sample chambers 108 and 107 will allow for any constituent to be measured by any instrument. This should be apparent by considering the following. First, measurement of the emulsion form is easy, as the emulsion form will generally be visible to all instruments so long as a sufficient sample is drawn. If measurement of only a single layer is to be performed, this is done by moving the sample between the chambers 107 and 108 (and the exhaust track) to provide the appropriate part of the sample to he appropriate instrument.

In same cases this is simple, for example, in an oil and water mixture, which has been allowed to separate, the oil will be on the top and the water will be on the bottom, thus, in either chamber, the lower instruments can easily perform tests on the water while the upper perform tests on the oil.

The more difficult situation is to reverse the scenario so as to use a lower mount instrument on the oil or an upper mount instrument on the water. In this case, generally the emulsion is allowed to separate in one of the chambers. The separated state is then slowly moved to the other chamber monitoring how much has been moved. As should be apparent, since the valve arrangement 103 and egress from the chamber is below the chamber 108 and 107 the water will be moved first. The movement is carefully monitored until an appropriate amount has been moved. For example, if a top mounted testing instrument in the other chamber was needed to test the water, generally an amount of water less than the total in the sample would be moved to the other chamber. This ensures that the other chamber has only water (and therefore water at the "top"). Should a lower instrument in the current chamber be needed to test oil, an amount greater than the expected amount of water will be moved to the second chamber. This should result in only oil being in the first chamber and, thus, oil being at the "bottom" of the first chamber.

While the above gives only a simple example, one of ordinary skill will understand that by moving the sample between the chambers 107 and 108 in the appropriate fashion, any constituent of the emulsion can be brought to any measurement device. The only truly difficult arrangement is if water is needed to be measured by an instrument which can only measure if the water substantially fills the chamber. However, even this is possible. Generally, the water will be separated to a chamber with the oil remaining in another. The chamber of the oil will then be moved to exhaust and the oil exhausted to waste. If this is insufficient water for a measurement to be performed, the water may be moved to the other chamber while being mixed with additional sample material taken from the process flow (and additional solvent to separate if appropriate). This will increase the total amount of water in the device 101. The water may then again be separated and the oil exhausted. This process can be repeated until one of the chamber is substantially full of water. This will generally be sufficient for any measurement. The same type of action may also be perfumed to get a single chamber substantially full of oil.

As discussed above, process measurements that require addition of a chemical reagent or solvent to form a color or extract an analyte can be performed within different industrial environments continuously and automatically thereby eliminating the time and expense of laboratory involvement by simply selecting appropriate additives and having them be mixed into the process fluid as part of the extraction step. Should multiple different tests need to be performed, the process fluid can be pulled into a first chamber while being mixed with a first additive, a test can be performed, and then the resultant fluid can be mixed with another additive and sent to the second chamber. This process can be repeated any number of times for different tests. Further, should one of the constituents be problematic with a certain additive, tests involving this problematic constituent can be performed first, the material can then be separated with that constituent being completely exhausted, and then the additive can be added to the remaining and positioned as needed. This can provide a method of extracting a broad range of anions, cations or chemical species that are not soluble in broad range of chemical streams found in chemical, petrochemical, food/beverage, bioprocessing and pharmaceutical plants around the world.

Many examples exist in scientific literature of anion or cation measurements which are reacted with a specific reagent to form compounds that when reacted form absorption or fluorescent products that are easily measured with laboratory based photometric or spectrophotometric instrument over a broad range of wavelengths (200-2400 nm). Examples are; iron ions in boiler feed water, copper ions in power plants, excess chlorine for drinking water plus many others.

Additionally hydrophilic or hydrophobic solvents can be used to separate components from analytes from either polar or non-polar matrices. Examples include, but are not limited to, detecting the presence and amount of corrosion inhibitors, scale inhibitors from produced water streams that contain both the cations and oil, calcium, magnesium ions in produced water streams that also contain interferences such as aromatic or aliphatic hydrocarbons when measuring the spectroscopic characteristics of the sample.

Extraction of a compound from a polar background such as water into a non-polar compound such as toluene can easily and efficiently be accomplished with the systems and method discussed herein because they need not rely on the traditional methods of mixing or reacting samples with reagents. Extraction with a solvent with a different polarity than water will produce a solvent layer and an aqueous layer after a brief settling time. There are different potential method of mixing samples with solvents or reagents using the systems and methods herein based on the dual cylinder construction and the ability to exchange a sample between the two cylinders. First as a sample travels from the mixing chamber 108 into the pump chamber 105 there is inversion mixing that occurs, the top volume of the sample becomes the bottom and the bottom becomes the top. Secondly as the sample travel through the valves there is high shear mixing that occurs and this happens every time the unit transfers sample between the mixing chamber 107 and the pump chamber 108.

Figure 7:
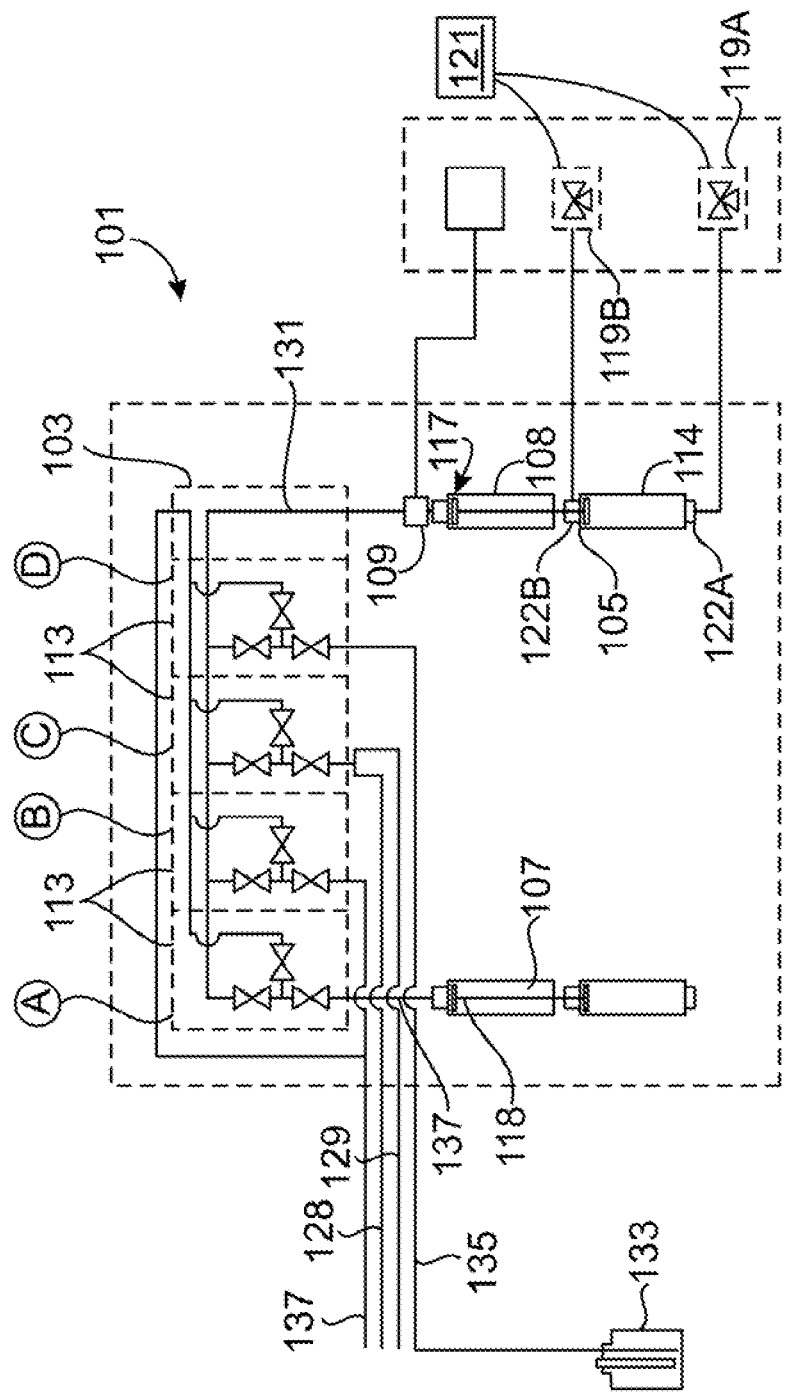
FIG. 7 depicts a schematic diagram of an embodiment of a switching module according to the present disclosure for illustrating fluid flow.

FIG. 7 depicts a schematic diagram of a piping and instrumentation layout for an embodiment of system 101. The depicted embodiment of FIG. 7 comprises a syringe pump system 105 in fluid communication with a mixing chamber 107 through a stream switching valve system 103.

Figure 5:
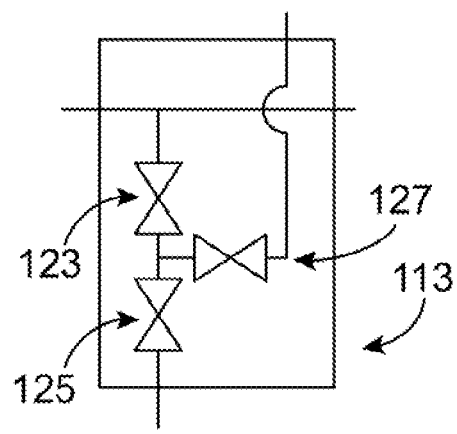
FIG. 5 depicts a schematic diagram of an embodiment of a fluid valve such as can be used in the stream switching valve system of FIG. 3.

As described elsewhere herein, the syringe pump system 105 comprises a pneumatic cylinder 114 having a syringe piston 115. The analysis system 109 is disposed in the fluid path at the egress end of the syringe pump chamber 108. A pair of regulators 119A and 119B are attached at the rod end 122A and cap end 122B of the cylinder 114, respectively, and controlled by a controller 121. As can be seen in the schematic of FIG. 7, as well as the embodiment of FIGS. 1 through 4B, the fluid path of the syringe pump system 105 passes through the analysis system 109 which is associated with one or both of the chambers 107 or 108 This facilitates mixed or extracted liquid being analyzed and pressured immediately after mixing or extraction. FIG. 5 provides some detail on a valve arrangement within a valve 113 to indicate how material may be selected or not for that particular attached source.

Figure 8A:
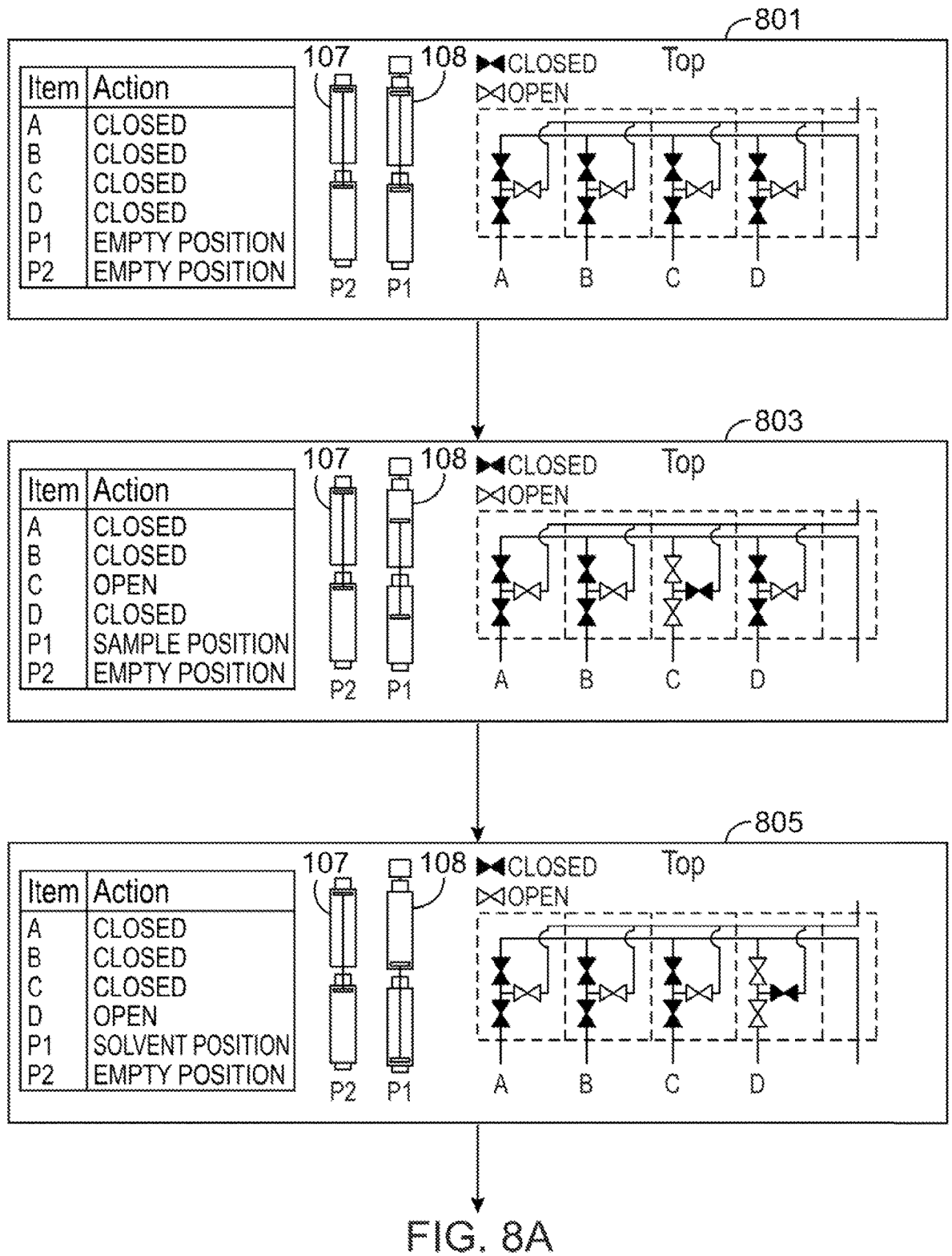
FIG. 8 depicts a chart of valve and piston positions of the device of FIGS. 1 through 4B according to an embodiment of a method of handling liquid.
Figure 8B:
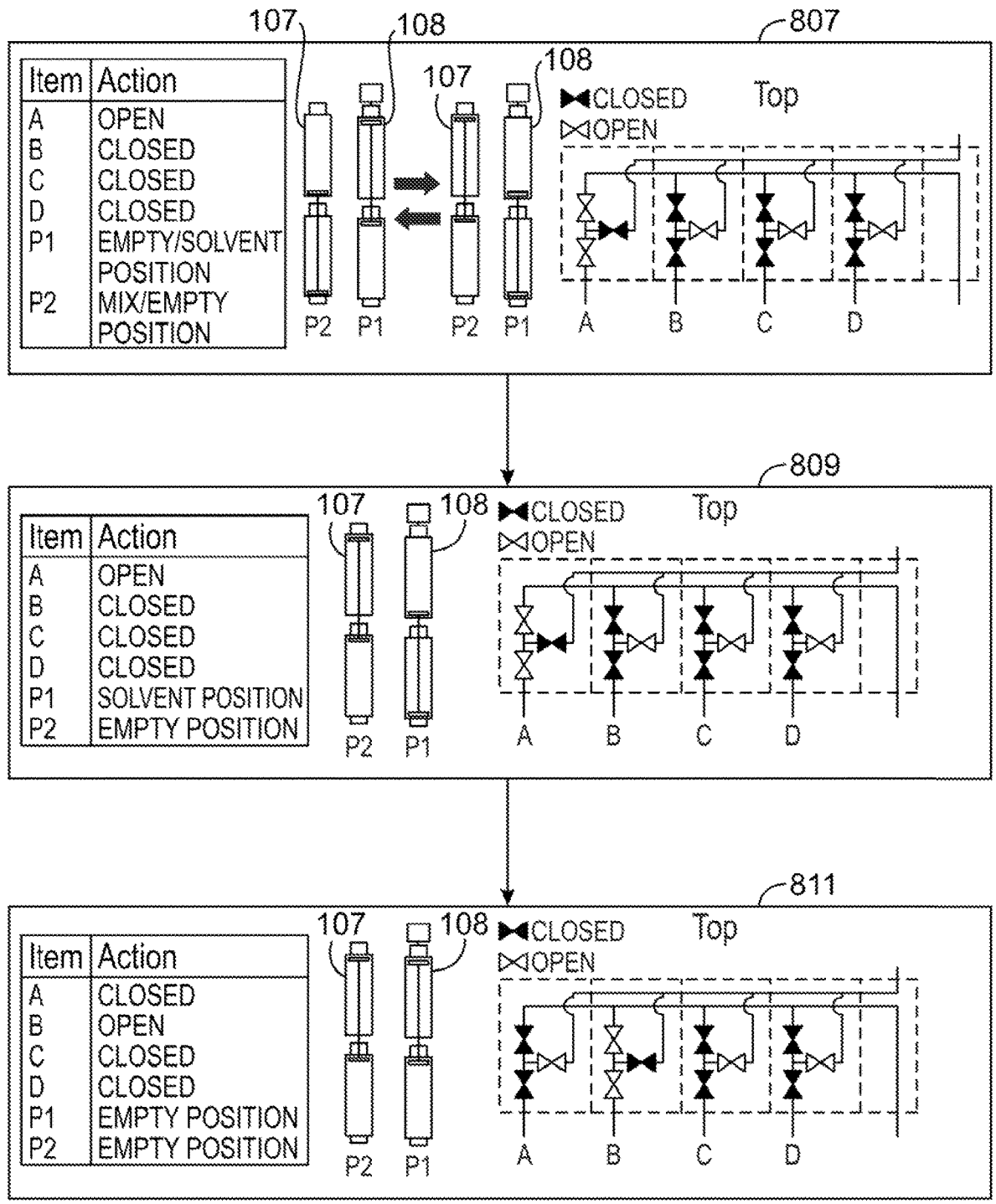
Figure 9A:
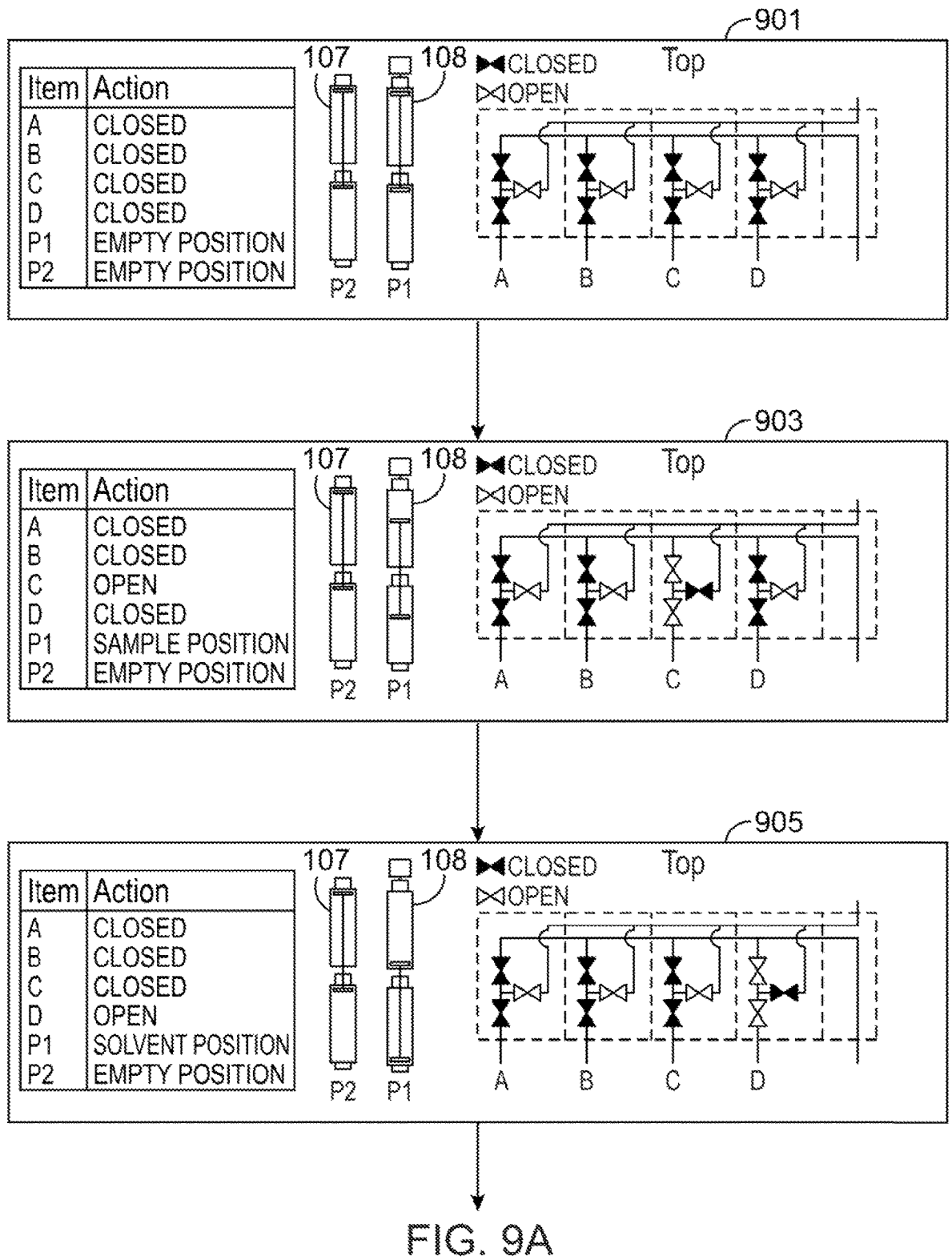
FIG. 9 depicts a chart of valve and piston positions of the device of FIGS. 1 through 4B according to an alternative embodiment of a method of handling liquid.
Figure 9B:
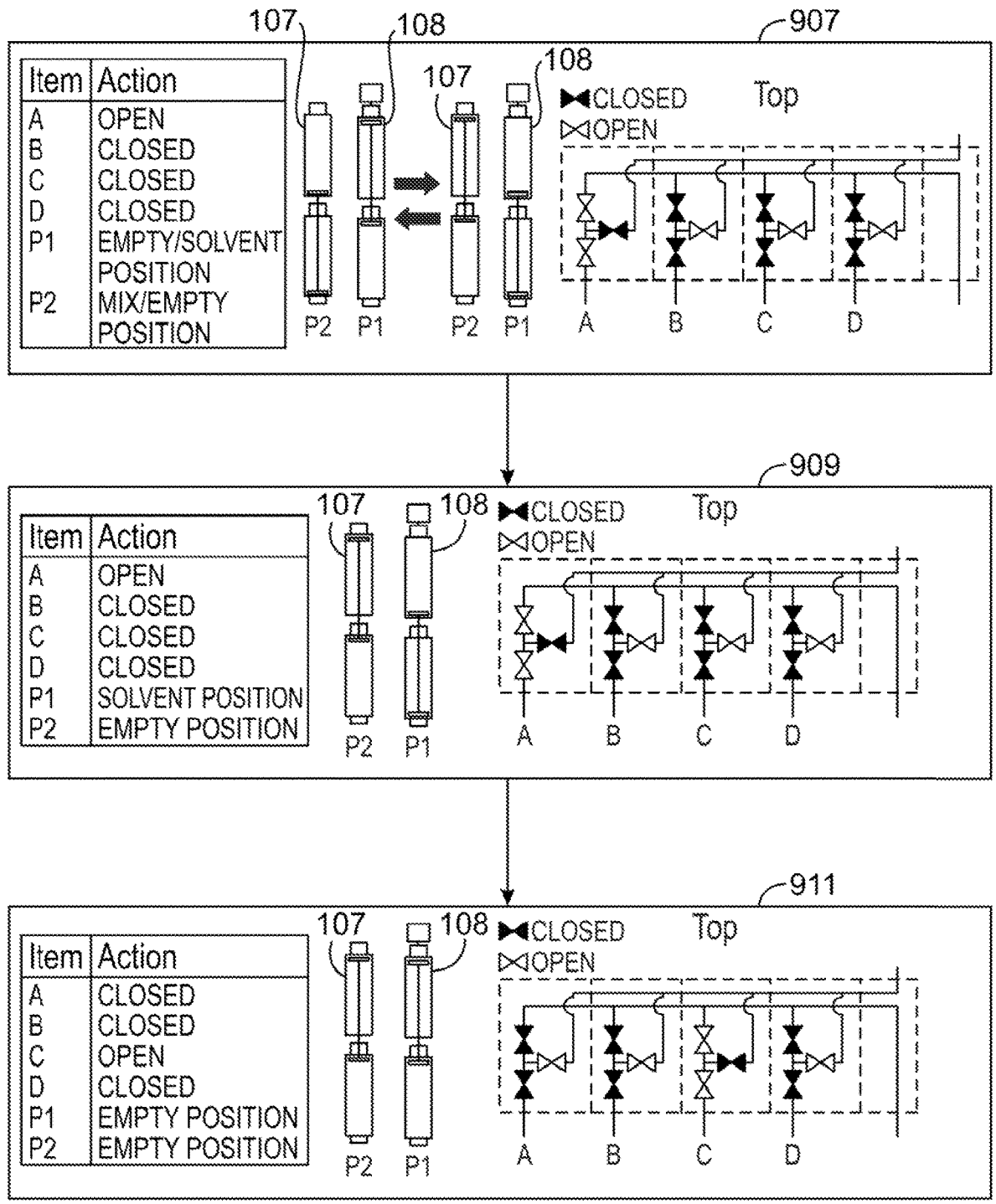
Figure 10A:
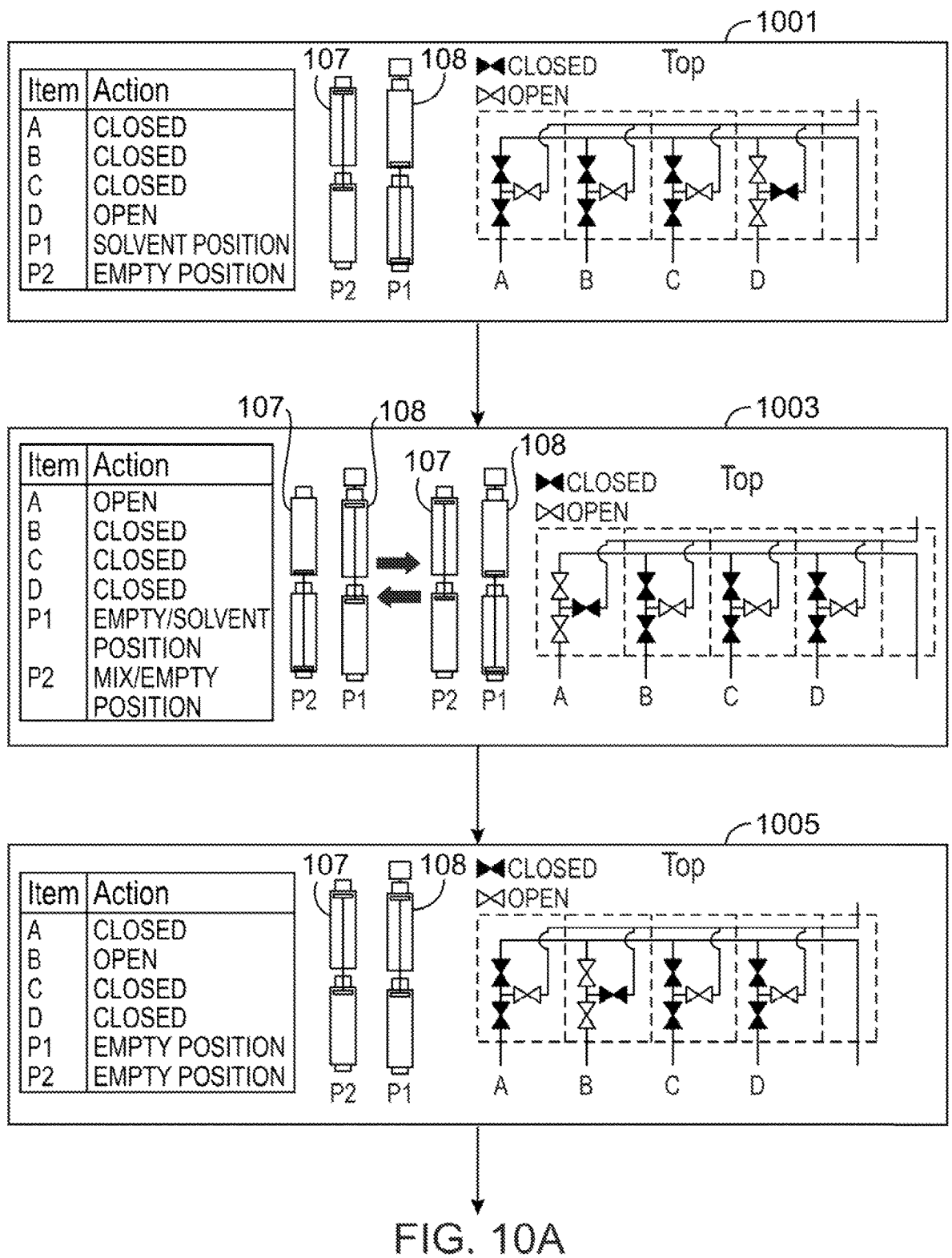
FIG. 10 depicts a chart of valve and piston positions of the device of FIGS. 1 through 4B according to an embodiment of a method of cleaning the device.
Figure 10B:
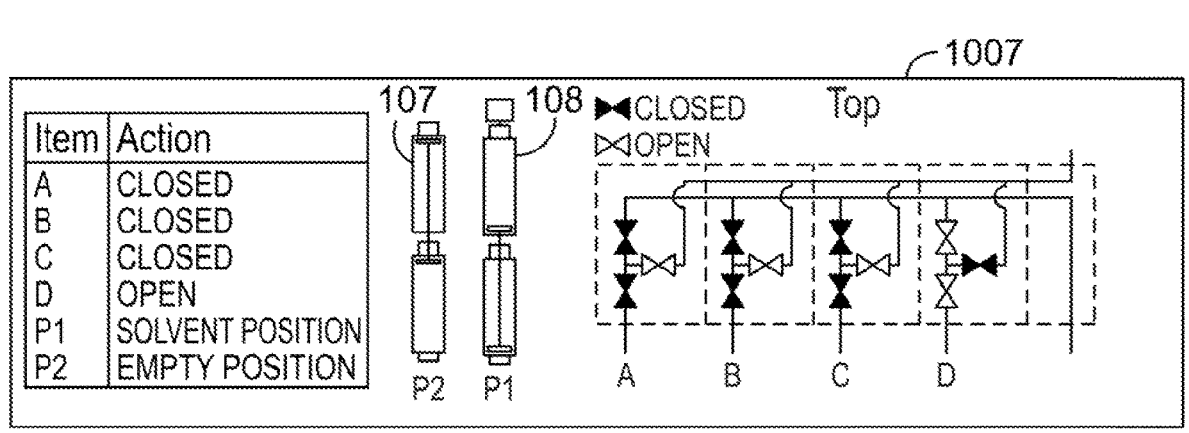

The depicted system 101 may be used in any number of different methods to mix or extract liquids or fluids in an emulsification or other colloid. While the above discussed these types of arrangements generally, FIGS. 8 through 10 provide for some specifics of operation of an arrangement as shown in FIG. 7 to perform a mixing and measurement operation. The depicted method of FIG. 8 comprises six steps: initialization 801, sample collection 803, solvent addition 805, mixing 807, measurement 809, and waste evacuation 811. Additionally, a solvent wash step 813 may be included. During initialization 801, valve 125 of each module 113 is closed, valve 123 of each module 113 is closed, and valve 127 of each module 113 is open. Additionally, pistons 117 and 116 are both in "empty position." As will be understood by one of ordinary skill in the art, the term "empty position" means that the piston head is disposed at the egress side of the mixing chamber 107 or the syringe pump chamber 108, respectively. In an embodiment, the pressure caused by fluid flow into the syringe pump chamber 108 can move the piston 115 out of empty position. Alternatively, the piston 115 may be pneumatically operated to create a vacuum in the fluid path and thereby pull fluid into the system.

As also can be seen in FIG. 5, and in more detail in FIG. 7, the valve system 103 comprises a plurality of stream-select modules 113. Each stream-select module 113 comprises three valves 123, 125 and 127. The valves 123, 125, and 127 are able to be individually set to open or closed positions. When closed, fluid flow through the valve is inhibited or prevented. When opened, fluid flow through the valve is facilitated or allowed.

In the sample collection 803 step, valve 125 for at least one module 113 is opened. In the depicted embodiment of FIG. 5, valve 125 for module C is opened. This is because the sample inlet line 128 and sample outlet line 129 are in fluid communication with valve 125 in module C. By opening valve 125 in module C, sample may be received by module C on the sample inlet line 128. Additionally, valve 123 in module C is also opened. As shown in the schematic of FIG. 5, valve 123 of each module 113 in the valve system 103 is in fluid communication with the syringe pump system 105 via a syringe pump fluid line 131. Each module 113 is in fluid communication with this line 131 via valve 123. Because valve 123 is closed and all modules except module C, when sample is received on sample inlet line 128 by module C it flows through valve 125 and valve 123 to line 131, and from there to the syringe pump chamber 108. However, because valves 123 are closed in modules A, B and D, the sample cannot flow through those modules. During this step 803, the path through the system is configured so that sample received on line 128 flows only to chamber 108.

In the next step, solvent addition 805, valves 125 and 123 in module C are closed, but valves 125 and 123 in module D are opened. As can be seen in the schematic of FIG. 5 in this configuration, valve 125 of module D is in fluid communication with a solvent reservoir 133 via a solvent reservoir fluid line 135. By opening valves 125 and 123 on module D only and closing valves 125 and 123 in A, B and C, and closing valve 127 on module D, the fluid flow path is configured so that only solvent flows from the solvent reservoir 133 through the solvent fluid line 135 through valve 125 and 123 of module D to the syringe pump fluid line 131 and from there into the syringe chamber 108. The addition of the solvent moves the syringe piston 115 to solvent position, meaning that the presence of both the sample and solvent in chamber 108 has pushed the piston 115 into the pneumatic cylinder 114. This arrangement is schematically represented in FIG. 8.

In the next step, mixing 807, valves 123 and 125 in module D are closed, valve 127 in module D is opened. Valves 123 and 125 in module A are opened and valve 127 of module A is closed. As can be seen in the schematic of FIG. 7, in this configuration, valve 125 of module A is in fluid communication with the mixing chamber 107. This configuration creates a fluid flow path from chamber 108 through fluid line 131 into valve 123 of module A, through valve 125 of module A to fluid line 137, and into mixing chamber 107. The controller 121 activates regulator 119A to advance the syringe piston 115 into chamber 108, forcing the contents of the chamber 108 through this fluid path into the mixing chamber 107. This in turn displaces the mixing chamber piston 116 which is operated to withdraw into the pneumatic cylinder 114, creating a vacuum in the fluid line and thereby pulling into the system the sample and/or solvent. This step 807 can be reversed by actuating regulator 119B via the controller 121 to withdraw the syringe piston 115, which creates a vacuum in the syringe chamber 108, which causes the mixture in the mixing chamber 107 to reverse through the fluid flow path back into the syringe pump chamber 108. This process of alternately actuating regulators 119A and 119B to insert and withdraw the syringe piston 115, and to thereby force the mixture back and forth through the fluid path to and from chambers 107 and 108, alternatingly, may be repeated one or more times. It should be apparent that the process only requires the use of a single piston 115 as the operation either to push fluid from the syringe chamber 108 or to create a vacuum which serves to pull fluid into the syringe chamber 108.

The next step, measurement 809, uses the same fluid path configuration of the valve system 103, except that the syringe piston 115 is withdrawn into the pneumatic cylinder 114, pulling the mixture into chamber 108. Because the analysis system 109 is disposed in the fluid path between the chamber 108 and fluid line 131, an amount of mixture is present in the analysis system 103 for measurement. Spectrographic, chromatographic, or other measurement may then be performed using the analysis system 109 according to techniques known in the art.

In the next step 811, waste evacuation, valves 123 and 125 in module A are closed, valve 127 is open, and valves 123 and 125 of module B are opened and valve 127 of module B is closed. In this configuration, valve 125 of module B is in fluid communication with a waste fluid line 137. The regulators 119A and 119B may then activate the syringe piston 115 to force fluid into chamber 108 to evacuate the fluid line 131. In this configuration, the only fluid path in the system is through module B to waste line 137. This step thus causes waste to evacuate the system 101. However, because some solvent may remain in the various lines, a solvent wash process 813 may then be followed. This solvent wash process 813 is depicted in FIG. 10, and described elsewhere herein. These six steps, optionally in conjunction in with the cleaning step, comprise a liquid-liquid extraction process performed using a single solvent, with all fluids expelled to waste.

FIG. 9 depicts an embodiment of an extraction process in which a liquid-liquid extraction is performed with a single solvent and all fluids are expelled to the sample stream, instead of waste as in FIG. 8. In the depicted method of FIG. 9, the same basic steps are followed, with some modifications. As can be seen in the depicted embodiment of FIG. 9, six steps are described, along with the optional solvent wash process 813 at the end. These depicted steps are initialization 901, sample collection 903, solvent addition 905, mixing 907, measurement 909, and waste evacuation 911. The first five steps 901, 903, 905, 907 and 909 are all performed in essentially the same manner as in the depicted embodiment of FIG. 8, with the valves of the modules 113 in the same open and closed positions, and the regulators 119A and 119B used to move the piston 115 in the same manner. However, with respect to step six, waste evacuation 911, valves 123 and 125 of module B are closed and valves 123 and 125 of module C are open, with valve 127 of module C closed. As can be seen in the schematic of FIG. 7, valve 125 of module C is in fluid communication with both a sample inlet 128 and sample outlet 129 fluid line. When the piston 115 is actuated by regulator 119A to force the fluid in chamber 108 out, the only available fluid path is through fluid line 131 into module C, through valve 123, and out of module C through valve 125 to the sample inlet 128 and sample outlet lines 129.

In the depicted method of FIG. 10, a solvent wash/zeroing process 813 is shown to indicate how the system can utilize the attached material sources to perform actions which do not specifically relate to a sample measurement, but utilize the same basic process of the device 101 to perform system maintenance and testing. The depicted process of FIG. 10 cleans the system 101 with solvent to remove sample that may have coated the optical interfaces over time or where a particularly poor sample is present in the device 101 and needs to be effectively destroyed. When the depicted cleaning process 913 is completed, fresh solvent may be introduced to the analysis chamber 109, and the measurement may be re-zeroed. The cleaning and/or zeroing process 813 may be user-initiated or set or scheduled to occur at a specific time interval.

The depicted cleaning/zeroing process of FIG. 10 comprises four primary steps. They are: solvent addition 1001, deep cleaning 1003, solvent evacuation 1005 and solvent addition/zeroing 1007. In the first step, solvent addition 1001, valve 125 on module D is open to allow fluid flow from solvent reservoir 133 via line 135. Additionally, valve 123 in module D is open to allow solvent to flow from the reservoir 133 through fluid line 135 into module D and out of module D to fluid line 131. Because all other valves 123 to the other modules 113 are closed, the only available fluid path for the solvent is to chamber 108 through the analysis cell 109. This moves the syringe piston 115 into solvent position.

In the next step, deep cleaning 1003, valves 123 and 125 of module D are closed, and valves 123 and 125 of module A are open. Likewise, valve 127 of module D is open and valve 127 of module A is closed. This creates a fluid path between chambers 108 and 107, similar to the configuration of the system during mixing. Regulators 119A and 119B can alternatingly move the piston 115 into empty and solvent position to force the fluid to alternate through the fluid path between chambers 107 and 108. Because this only available fluid path is the path where residue fluid from prior use is likely to be present, this action cleans the fluid lines. The deep cleaning step may be repeated by alternately actuating regulators 119A and 119B via controller 121 until the system is clean.

Next, in solvent evacuation 1005, valves 123 and 125 of module A are closed and valve 127 of module A is open. Valves 123 and 125 of module B are opened and valve 127 is closed. As can be seen in the schematic of FIG. 7 this results in the only fluid path being from chamber 108 to waste line 137. Again, by actuating regulator 119A, the syringe piston 115 can force the cleaning solvent through module B to the waste line 137.

Finally, in the solvent addition/zero step 1007, valves 123 and 125 of module D are opened, and valve 127 is closed. Fresh solvent may be placed in the solvent reservoir 133, and the piston 115 is withdrawn into the cylinder 114 to create a vacuum and pull the fresh solvent from the reservoir 133 through fluid line 135 and module D into the analysis system 109. The zeroing process may then be carried out according to techniques known in the art.

It should be recognized that while the above contemplates a number of different analysis possibilities, others may also be used. For example, as the movement of samples between the cylinders involves an inversion (the material on the bottom of one cylinder is the first to be moved to the other cylinder), it is possible to actually utilize the system to physically separate two constituent materials so that each may be acted on completely independently. For example, if an emulsion of oil and water was originally mixed with a solvent and allowed to separate, the result will generally be in the cylinder with a lower water level, a next layer with solvent and or rag composition, and an upper layer primarily of oil. As the fluid sample moves from one chamber to the other, the water would be first to be ejected, followed by the solvent/rag layer, and then the oil. To the extent that a test is to be performed on one layer where, for example, a necessary additive would not function correctly if the other layer(s) were present, the layers can be physically separated by placing the target constituent alone in a chamber.

To mix the additive with just the water layer alone, the additive would be added while the material is slowly ejected from the chamber to the material as it enters the other chamber. As this is the water initially, the additive is only mixing with water. Upon detection that the solvent/rag layer is approaching the bottom, the pump action may cease so none of the rag layer or oil layer ever leaves the initial chamber. At this time, there is only water and additive in the other chamber, and the appropriate test may be performed.

To mix the additive with the oil layer alone, the same above process would be performed, but the rag/solvent layer would be allowed to go to the second chamber as well as the water layer and no additive would be mixed during this step. The contents of the second chamber would then be ejected to waste, and the oil layer would be mixed with the additive as it was moved to the other chamber. It should also be apparent that a variation can also be performed with each layer having a unique test performed on it by following the step of moving/mixing the water later, performing the water test, moving the rag/solvent layer to the chamber with the water, ejecting the contents of the chamber with water and rag/solvent to waste, and then moving/mixing the oil layer.

Figure 11:
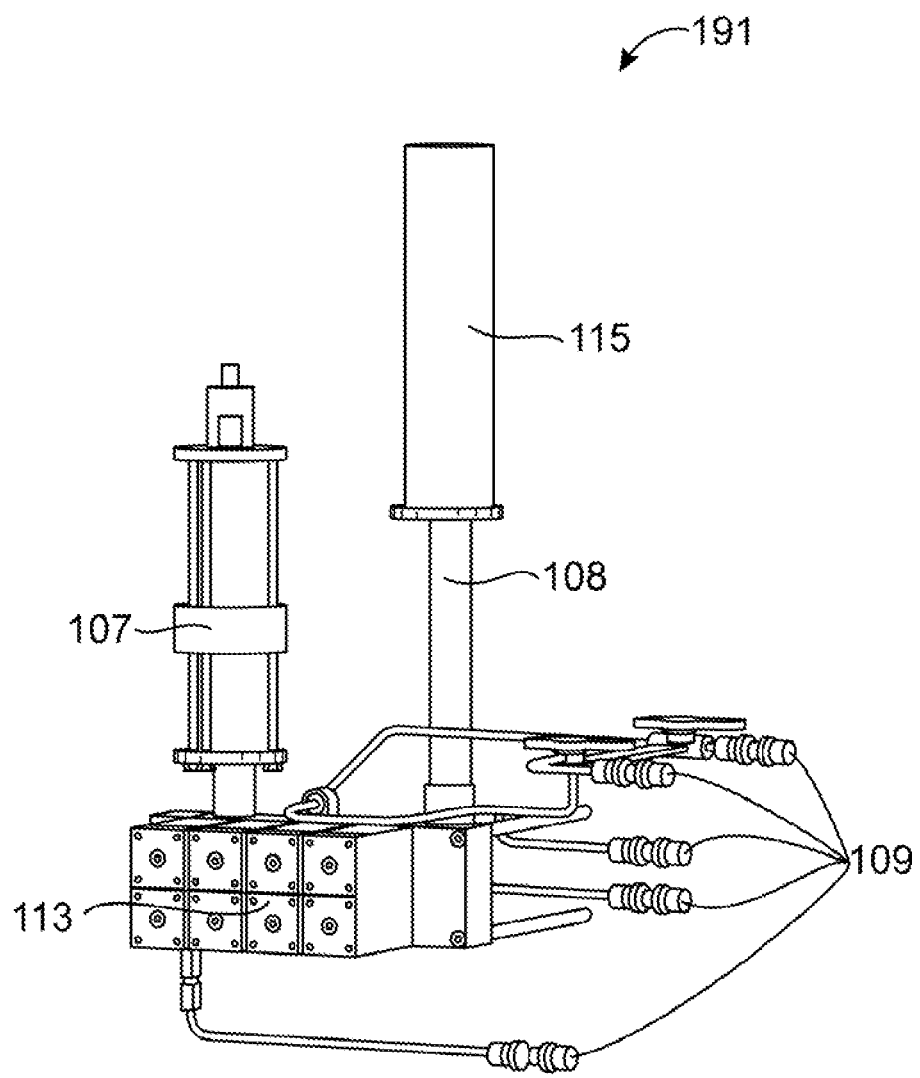
FIG. 11 depicts a front perspective view of a second embodiment of a liquid handling system which utilizes only a single pump, but two sample chambers.

While the above focuses on the operation of the device shown in FIGS. 1 through 4B it should be apparent that it would operate similarly in less complex arrangements of chambers and pumps. These latter types of devices can be useful where the types of measurements are similar, but fewer measurements are needed, less mixing is needed, or simply where less options for the mixing need to be available. For example, while the device of FIGS. 1-4B provides for two sample chambers 107 and 108 and two pumps 115, the device 191 of FIG. 11 provides for two sample chambers 107 and 108 and only a single pump 115. Further, the device 191 of FIG. 11 generally is actually designed to only have measurement performed on chamber 107 with chamber 108 used purely for extraction, mixing, or separation steps. The operation of device 191 while being simplified and having less options, is generally similar to the operation of device 101.

Figure 12:
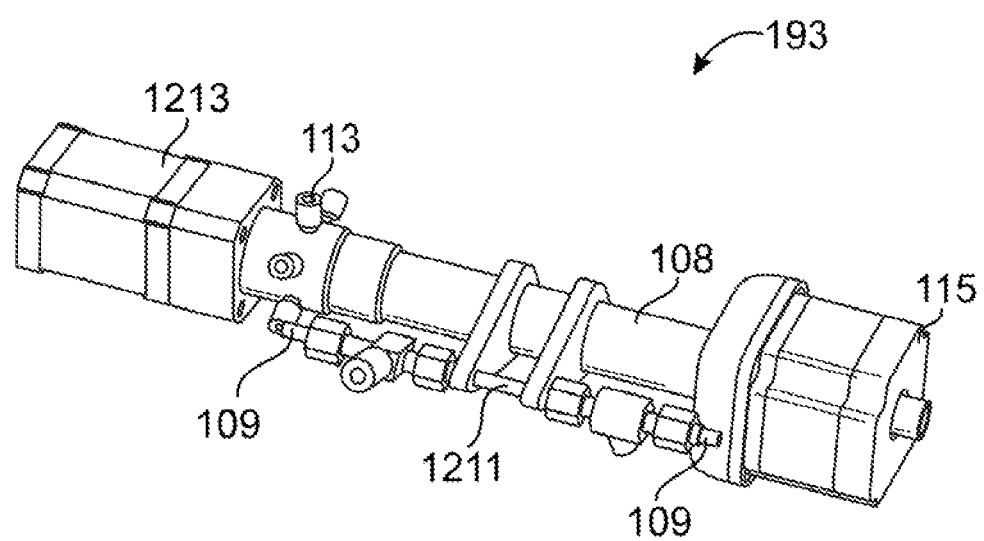
FIG. 12 depicts a front perspective view of a second embodiment of a liquid handling system which utilize only a single pump and single sample chamber.

FIG. 12 provides for a still further simplification of the options by using device 193. In device 193 only a single chamber 108 and pump 115 is used. This device 193, therefore, will generally only be able to perform a single mixing step during extraction and will often perform the liquid input selection sequentially as opposed to having a simultaneous extraction from multiple sources. Because of this, the valve arrangement 113 is also simplified and a valve selector 1213 is used. In operation, the valve selector 1213 will act to sequentially select from the variety of input valves 113 as the pump 115 is withdrawn. Amounts of each constituent (including the sample) will be selected as the pump 115 withdraws with each being added sequentially to the sample. Thus, the valve selector 1213 may initially select a first input and the pump 115 withdraws to pull a first amount, the valve selector 1213 then changes the input to a second input after which the pump 115 withdraws more to add a second amount. This process may be repeated until all constituents are selected and pulled into chamber 108. Generally, the pumping action will provide sufficient shear to mix and to provide good mixing of the various inputs, but larger constituent amounts may be added later in the process to further assist with this.

Again, the device 193 may have a plurality of measurement devices 109 attached thereto which may be used to measure the result in emulsion, or the emulsion may be allowed to settle so measurements may be performed on different continuants. Once the measurements are completed in this device, the pump selector 1213 will generally select a valve path 113 which is exhaust and the sample will be exhausted by the pump 115 reversing direction and pushing all the contents from the chamber 108.

As should be apparent from FIG. 12, this device 193 allows for many of the benefits of the devices 101 and 191, but does not allow for movement of the sample between two chambers and therefore cannot allow for later mixing of additional chemicals with the sample, or of complete physical separation of the two constituents on the emulsion. However, FIG. 12 does still allow for a single of the continuants to be tested alone, so long as it is the last to be exhausted based on the valve positions 113.

The qualifier "generally" and similar qualifiers, as used in the present case, would be understood by one of ordinary skill in the art to accommodate recognizable attempts to conform a device to the qualified term, which may nevertheless fall short of doing so. This is because terms such as "cylinder" are purely geometric constructs and no real-world component is a true "cylinder" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally," and relationships contemplated herein regardless of the inclusion of such qualifiers, to include a range of variations from the literal geometric meaning of the term in view of these and other considerations.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A device for handling a sample comprising:
   a pump;
   a pump chamber;
   a valve arrangement; and
   a mixing chamber;
   wherein, said pump will provide a liquid sample from a sample source to said pump chamber, said liquid sample passing through said valve arrangement;
   wherein, while said liquid sample is moving through said valve arrangement, a liquid additive is simultaneously pulled from an additive source through said valve arrangement and said liquid sample and said liquid additive are mixed in said pump chamber by the action of said pump to form a mixture;
   wherein said mixture can be moved from said pump chamber to said mixing chamber through said valve arrangement by said pump, said mixture being agitated by said movement;
   wherein a measurement can be taken of said mixture in said pump chamber; and
   wherein an additional liquid additive is simultaneously pulled from an additional additive source through said valve arrangement and said liquid sample, said liquid additive, and additional liquid additive are mixed in said pump chamber by the action of said pump on said mixture.

2. The device of claim 1 wherein said mixture can be returned to said pump chamber from said mixing chamber through said valve arrangement by said pump, said mixture being agitated by said movement.

3. The device of claim 1 wherein said measurement is a fluorescence measurement.

4. The device of claim 1 wherein said measurement is a light absorption measurement.

5. A device for handling a sample comprising:
a pump;
a pump chamber;
a valve arrangement; and
a mixing chamber;
wherein, said pump will provide a liquid sample of an emulsion from a sample source to said pump chamber, said liquid sample passing through said valve arrangement;
wherein, while said liquid sample is moving through said valve arrangement, a liquid additive is simultaneously pulled by said pump from an additive source through said valve arrangement and said liquid sample and said liquid additive are mixed in said pump chamber by the action of said pump;
wherein said mixture can be moved from said pump chamber to said mixing chamber through said valve arrangement by said pump, said mixture being agitated by said movement;
wherein a measurement can be taken of said mixture in said pump chamber;
wherein said liquid additive is a solvent separating a first immiscible from said emulsion;
wherein said first immiscible is moved from said pump chamber to said mixing chamber through said valve arrangement by said pump and what remains of said emulsion after said first immiscible is left in said pump chamber.

6. The device of claim 5 wherein said measurement is performed on said liquid sample before said emulsion separates.

7. The device of claim 5 wherein said measurement is performed on what remains of said emulsion after said first immiscible has been separated.

8. The device of claim 5 wherein said first immiscible is exhausted from said system and said remains of said emulsion after said first immiscible is separated is moved to said mixing chamber by said pump.

9. The device of claim 8 wherein said remains of said emulsion after said first immiscible is separated is mixed with an additional additive from said valve arrangement as it is moved to said mixing chamber by said pump.

10. The device of claim 5 wherein said remains of said emulsion after said first immiscible is separated is then exhausted from said system via said valve arrangement by said pump and said first immiscible is moved to said pump chamber by said pump.

11. The device of claim 10 wherein said first immiscible is mixed with an additional additive from said valve arrangement as it is moved to said pump chamber by said pump.

12. The device of claim 10 wherein said measurement is performed on said first immiscible.

13. The device of claim 5 wherein said emulsion is an oil and water emulsion.

14. The device of claim 13 wherein said additive is toluene.

15. The device of claim 5 wherein said measurement is a fluorescence measurement.

16. The device of claim 5 wherein said measurement is a light absorption measurement.

17. A device for handling a sample comprising:
a pump;
a pump chamber;
a valve arrangement; and
a mixing chamber;
wherein, said pump will provide a liquid sample of an emulsion from a sample source to said pump chamber, said liquid sample passing through said valve arrangement;
wherein, while said liquid sample is moving through said valve arrangement, a liquid additive is simultaneously pulled by said pump from an additive source through said valve arrangement and said liquid sample and said liquid additive are mixed in said pump chamber by the action of said pump;
wherein said mixture can be moved from said pump chamber to said mixing chamber through said valve arrangement by said pump, said mixture being agitated by said movement;
wherein a measurement can be taken of said mixture in said pump chamber;
wherein said liquid additive is a solvent separating a first immiscible from said emulsion; and
wherein said emulsion is an oil and water emulsion.

18. The device of claim 17 wherein said additive is toluene.

19. The device of claim 17 wherein said measurement is a fluorescence measurement.

20. The device of claim 17 wherein said measurement is a light absorption measurement.

* * * * *